United States Patent
Yamaguchi

(10) Patent No.: US 8,960,387 B2
(45) Date of Patent: Feb. 24, 2015

(54) DAMPER POSITION ADJUSTING DEVICE

(75) Inventor: Koushi Yamaguchi, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 190 days.

(21) Appl. No.: 13/391,492

(22) PCT Filed: Aug. 18, 2010

(86) PCT No.: PCT/JP2010/063900
§ 371 (c)(1),
(2), (4) Date: Apr. 2, 2012

(87) PCT Pub. No.: WO2011/021631
PCT Pub. Date: Feb. 24, 2011

(65) Prior Publication Data
US 2012/0181124 A1    Jul. 19, 2012

(30) Foreign Application Priority Data

Aug. 21, 2009   (JP) .................................. 2009-191868

(51) Int. Cl.
| | |
|---|---|
| F16F 9/00 | (2006.01) |
| F16F 9/44 | (2006.01) |
| F16F 9/54 | (2006.01) |
| E05F 5/02 | (2006.01) |

(52) U.S. Cl.
CPC . *F16F 9/54* (2013.01); *E05F 5/027* (2013.01); *E05Y 2201/21* (2013.01); *E05Y 2600/10* (2013.01); *E05Y 2600/20* (2013.01); *E05Y 2800/21* (2013.01); *E05Y 2800/242* (2013.01)
USPC ........................................ 188/321.11; 16/56

(58) Field of Classification Search
USPC ........................ 188/321.11, 205 R; 16/49, 56
See application file for complete search history.

(56) References Cited

U.S. PATENT DOCUMENTS

| | | | |
|---|---|---|---|
| 6,457,378 B2 * | 10/2002 | Hatakoshi et al. | 74/525 |
| 7,971,691 B2 * | 7/2011 | Holzapfel | 188/321.11 |
| 2006/0220284 A1 | 10/2006 | Holzapfel | |
| 2011/0094055 A1 * | 4/2011 | Domenig et al. | 16/83 |

FOREIGN PATENT DOCUMENTS

| | | |
|---|---|---|
| JP | 5-44466 | 11/1993 |
| JP | 2004-218246 | 8/2004 |

(Continued)

OTHER PUBLICATIONS

Japanese Official Action—2010-546157—Apr. 24, 2012.

(Continued)

*Primary Examiner* — Thomas J Williams
(74) *Attorney, Agent, or Firm* — Young & Thompson

(57) ABSTRACT

Provided is a damper position adjusting device capable of adjusting a damping force over a wide adjustment range and facilitating the adjustment work of the position of the damper. The damper position adjusting device has a damper base 38 for storing a plurality of dampers 32 in parallel to each other, each of the dampers 32 having a rod 32a that moves relative to a cylinder 32b; and a damper adjusting shaft 40 which is mounted rotatable in the damper base 38 and has a side wall 44 in contact with ends of the dampers 32 in a moving direction. By rotating the damper adjusting shaft 40, the side wall of the damper adjusting shaft 40 pushes at least one of the dampers 32 out in the moving direction of the rod 32a to change a position of the damper 32 relative to the damper base.

13 Claims, 16 Drawing Sheets

(56) References Cited

FOREIGN PATENT DOCUMENTS

| JP | 2006-002375 | 1/2006 |
| JP | 2006-104680 | 4/2006 |
| JP | 2006104680 A * | 4/2006 |
| JP | 2006-283973 | 10/2006 |
| JP | 2007-291695 | 11/2007 |
| JP | 2008-151204 | 7/2008 |
| JP | 2009-287237 | 12/2009 |

OTHER PUBLICATIONS

International Search Report—PCT/JP2010/063900—Sep. 28, 2010.

* cited by examiner

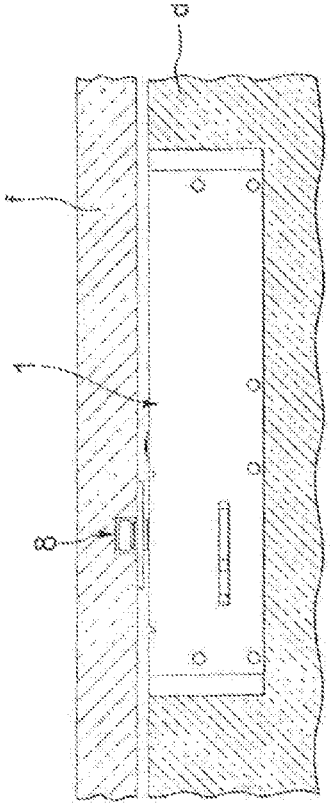
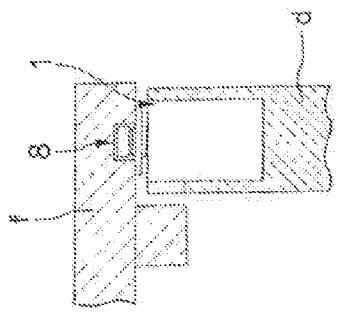
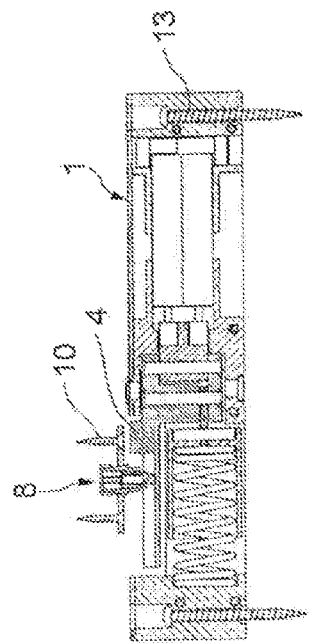
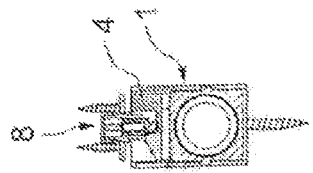
FIG.5(a)
FIG.5(b)
FIG.5(c)
FIG.5(d)

A-A cross section

B-B cross section

C-C cross section

A-A cross section

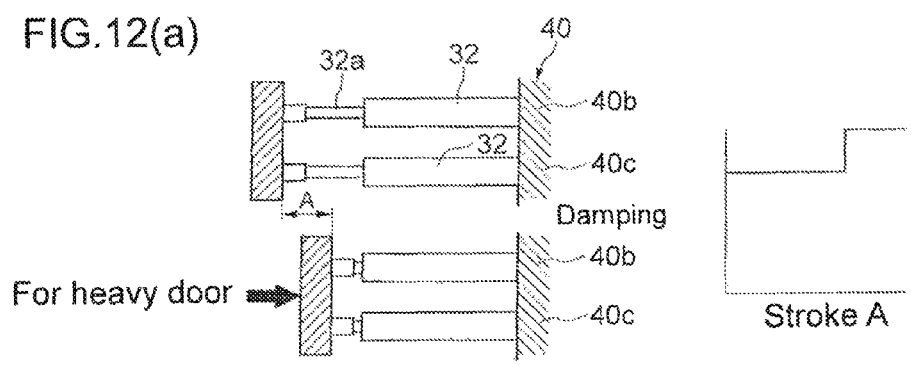
FIG.12(a) For heavy door
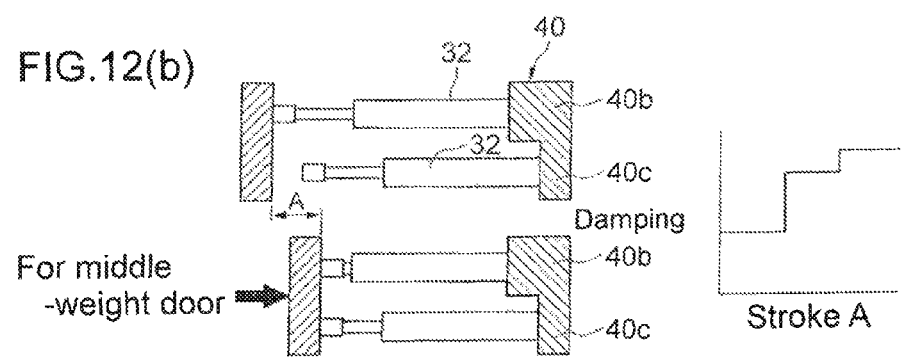
FIG.12(b) For middle-weight door
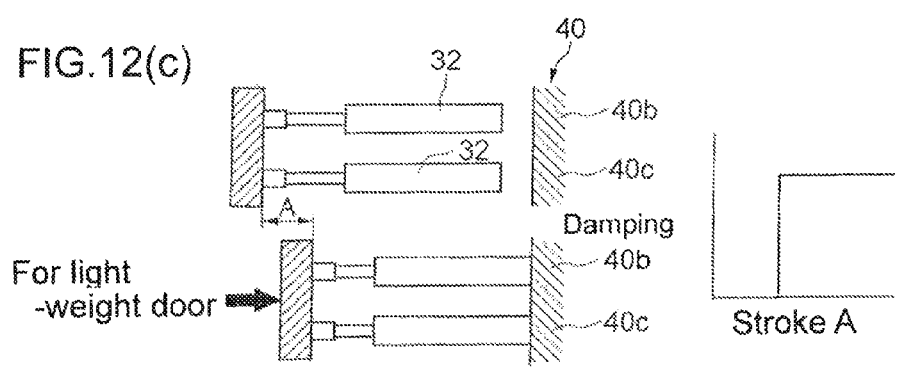
FIG.12(c) For light-weight door

DAMPER POSITION ADJUSTING DEVICE

TECHNICAL FIELD

The present invention relates to a damper for attenuating impact when closing a moving body, such as a construction door, a sliding door, a furniture door, a drawer or the like, and particularly to a damper position adjusting device capable of adjusting the position of the damper.

BACKGROUND ART

In order to attenuate impact when closing a moving body of a construction or furniture forcefully, there is provided a damper. Such dampers include an extendable damper of which a movable part such as a rod moves relative to a damper main body such as a cylinder and a rotary damper which is provided on a rotational axis of a door to resist rotation of the door.

Performance of the damper is determined in accordance with a weight of the moving body. That is, a damper with a great damping force is selected for a heavy moving body and a damper with a small damping force is selected for a light moving body. In order to get the most out of the damper, it is necessary to select an optimal damper in accordance with the weight of the moving body.

In order to adjust the damping force of the damper that acts on the moving body, there is a damper position adjusting device. The damper position adjusting device adjusts the position of the damper in contact with the moving body thereby to adjust the damping force.

Patent Literature 1 discloses a furniture damper holder for adjusting the position of the tip end of a rod of an extendable damper with use of a lead screw mechanism. This furniture damper holder has a moving part with an outside screw formed thereon and a base part with an inside screw formed thereon in engagement with the outside screw. By rotating, the moving part moves in an axial direction relative to the base part. On the moving part, a damper is mounted and the damper moves in the axial direction together with the moving part.

Patent Literature 2 discloses a damper device in which a worm gear is mounted on a housing and the worm gear is used to position a stopper relative to the housing. The stopper is in contact with the damper. Hence, the position of the damper can be adjusted by adjusting the position of the stopper.

According to the damper position adjusting devices as disclosed in PL1 and PL2, it is possible to adjust the position of the damper, thereby optimizing the damping force of the damper that acts on the moving body.

CITATION LIST

Patent Literature

PL1: Japanese Patent Application Laid-Open No. 2006-104680
PL2: Japanese Patent Application Laid-Open No. 2006-283973

SUMMARY OF INVENTION

Technical Problem

However, in any of these damper position adjusting devices, the position of a single damper is adjusted. Therefore, the damping force is adjusted only over a limited adjustment range and cannot be adjusted over a wide range, problematically. If plural dampers are provided in order to broaden the adjustment range of the damping force, the dampers need to be position-adjusted independently and the position adjustment work of the dampers is time-consuming.

Then, the present invention aims to provide a damper position adjusting device capable of adjusting a damping force over a wide adjustment range and facilitating the adjustment work of the position of the damper.

Solution to Problem

In order to solve the above-mentioned problems, an aspect of the present invention is a damper position adjusting device comprising: a damper base for storing a plurality of dampers in parallel to each other, each of the dampers having a movable part that moves relative to a damper main body; and a damper adjusting shaft which is mounted rotatable in the damper base and has a side wall in contact with ends of the dampers in a moving direction, wherein when the damper adjusting shaft rotates around an axis thereof, the side wall of the damper adjusting shaft pushes at least one of the dampers out in the moving direction of the movable part to change a position of the damper relative to the damper base.

Advantageous Effects of Invention

According to the present invention, as the damper adjusting shaft is used to change the position of at least one of plural dampers arranged in parallel in the damper base, it is possible to broaden the adjustment range of the damping force. Besides, as the single damper adjusting shaft is used to be able to change the position of at least one of the plural dampers, it is also possible to facilitate the adjustment work of the damping force.

BRIEF DESCRIPTION OF DRAWINGS

FIGS. 5(a) to 5(d) illustrate the door opening and closing device mounted in the door and the catch mounted in the frame (FIG. 5(a) is a side view, FIG. 5(b) is a front view, and FIGS. 5(c) and 5(d) are cross sectional views corresponding to FIGS. 5(a) and 5(b), respectively);

FIGS. 12(a) to 12(c) are schematic diagrams illustrating the relationship between positions of the damper and damping forces (FIG. 12(a) illustrates the case of a heavy door, FIG. 12(b) illustrates the case of a middle-weight door, and FIG. 12(c) illustrates the case of a light-weight door);

DESCRIPTION OF EMBODIMENTS

With reference to the attached drawings, description is made about a door opening and closing device in which a damper position adjusting device 39 according to an exemplary embodiment of the present invention is installed. The damper position adjusting device 39 is installed in the door opening and closing device for assisting opening and closing of a door. The damper position adjusting device 39 adjusts the position of a damper 32. The damper 32 is provided in contact with an arm 4 of the door opening and closing device 1 for attenuating impact when the arm 4 gets closed (see FIG. 6).

Figure 1:
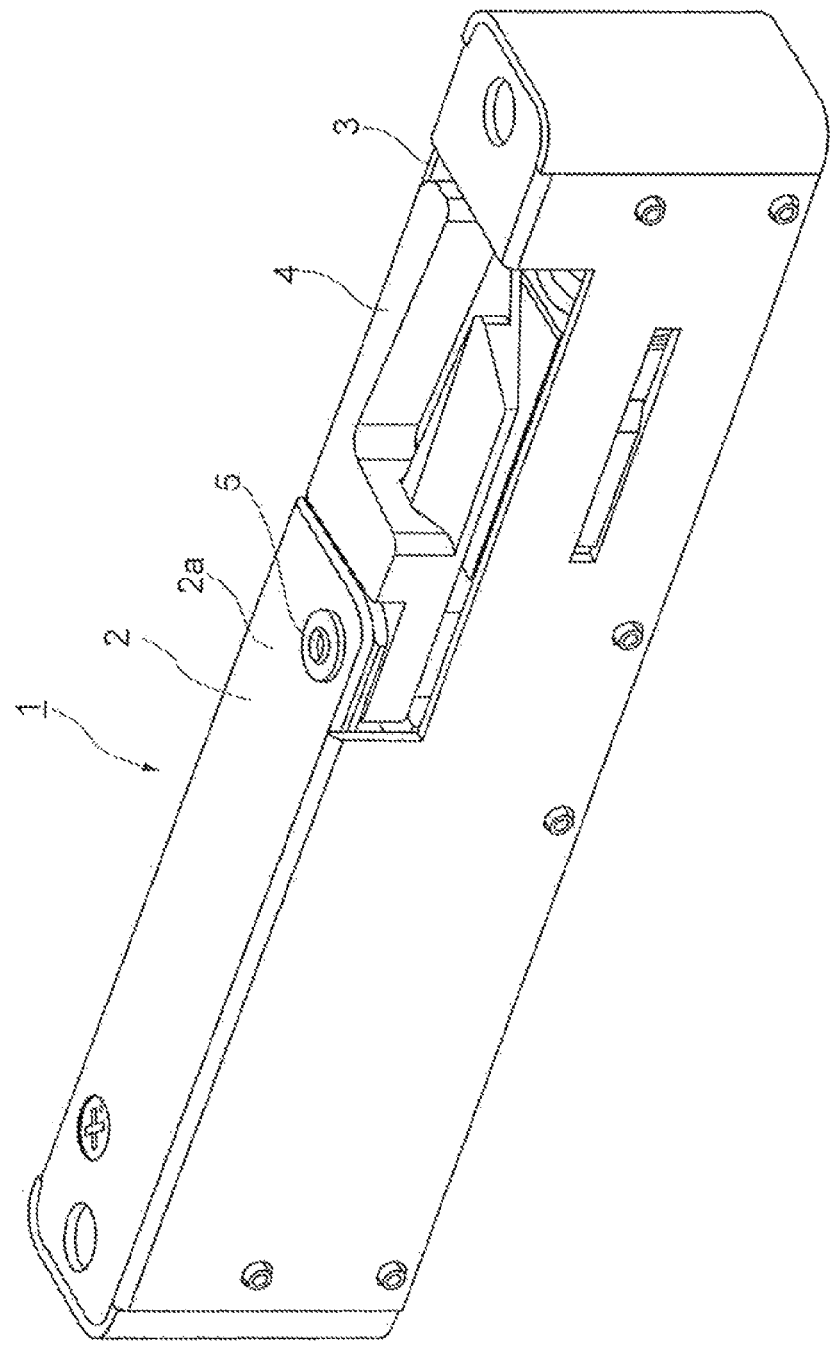
FIG. 1 is a perspective view illustrating appearance of a door opening and closing device in which a damper position adjusting device according to one embodiment of the present invention is installed.

FIG. 1 is a perspective view illustrating appearance of the door opening and closing device. The door opening and closing device 1 is used to assist opening and closing of a door and cooperates with a catch to attenuate impact when the door gets closed forcefully by wind or the like and to make a half-open door closed completely.

A body case 2 of the door opening and closing device 1 is formed into an elongated rectangular solid. At a ceiling part 2a of the body case 2, a notch 3 is formed, in which a retractable arm 4 is arranged. The retractable arm 4 is rotatable in the horizontal plane around a retractable arm axis 5 and is exposed at the notch 3 (see FIG. 2).

Figure 2A:
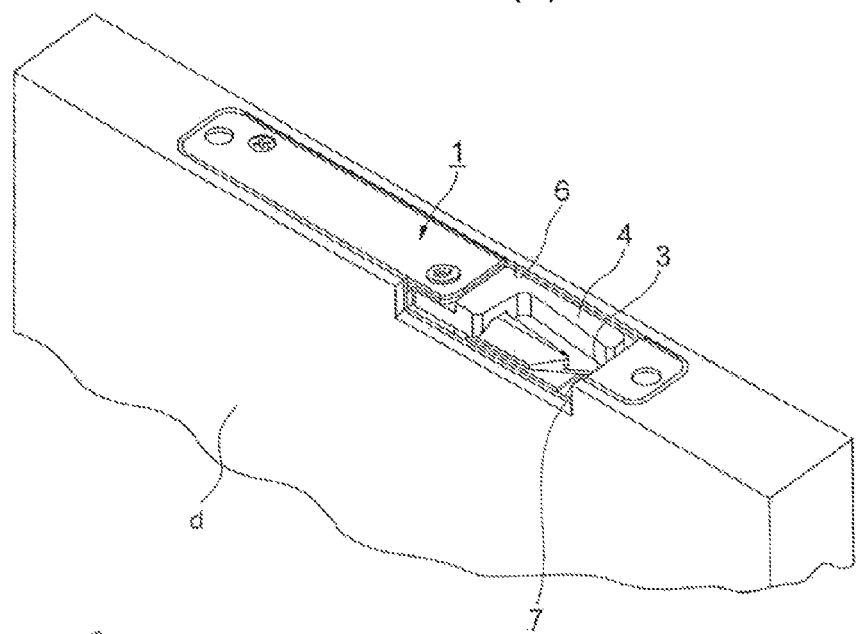
FIGS. 2(a) and 2(b) are perspective views illustrating appearance of the door opening and closing device mounted in a door (FIG. 2(a) illustrates a retractable arm in a closed state and FIG. 2(b) illustrates the retractable arm in a half-open state)
Figure 2B:
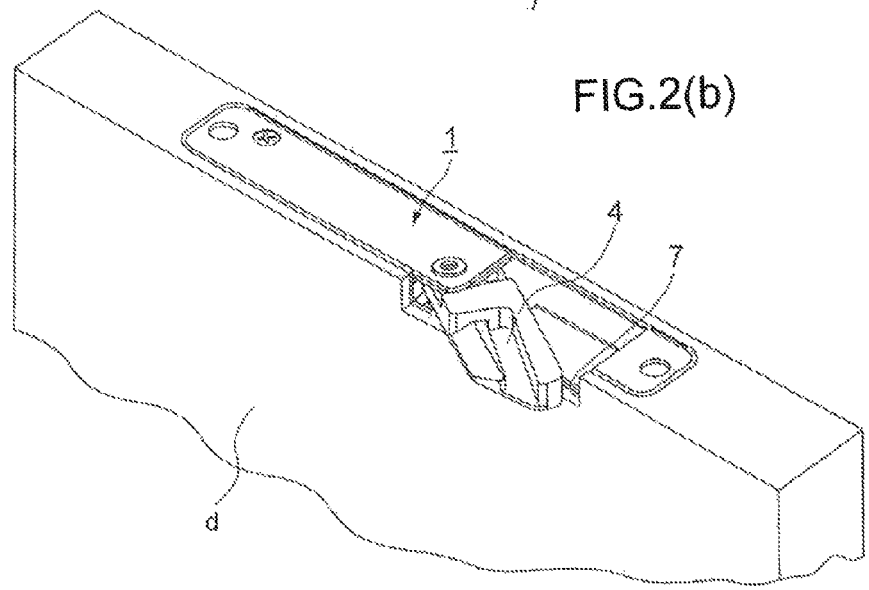

As illustrated in FIG. 2(a), in the upper surface of the door d, a box-shaped hole 6 is formed corresponding to the outer shape of the body case 2, and the door opening and closing device 1 is recessed in the hole 6. In the upper surface of the door d, a notch 7 is formed for exposing the retractable arm 4 at the position corresponding to the notch 3 of the body case 2. FIG. 2(a) illustrates the retractable arm 4 in the closed state. FIG. 2(b) illustrates the retractable arm 4 which is rotated from the closed state and exposed at the notch 7 of the door d.

Figure 3:
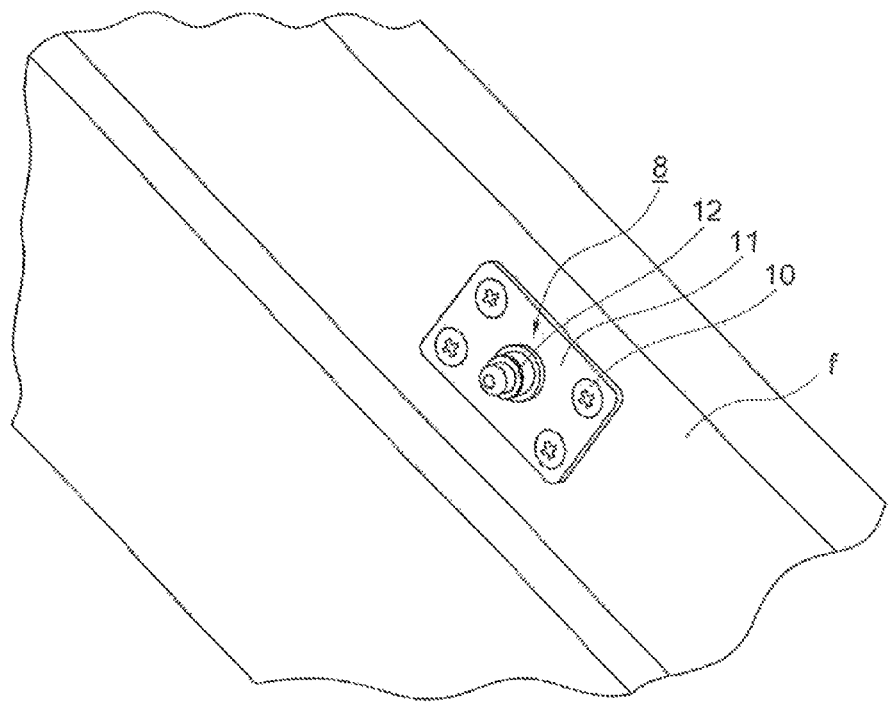
FIG. 3 is a perspective view illustrating a catch mounted in a lower surface of a frame.
Figure 4A:
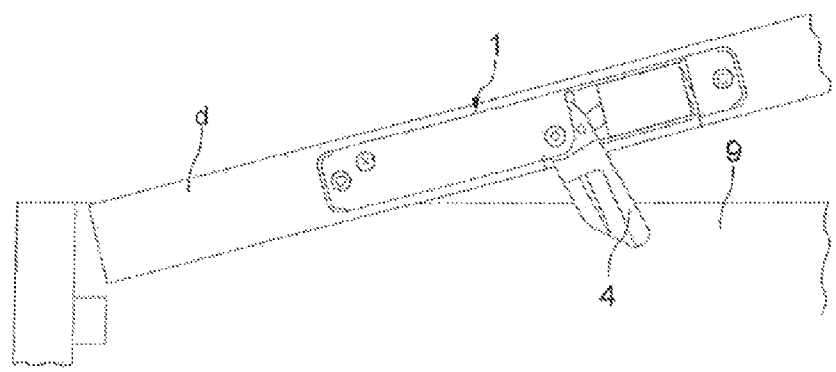
FIGS. 4(a) and 4(b) are views illustrating operations of the door opening and closing device when the door opens and closes (FIG. 4(a) illustrates the door being closed to catch a catch shaft by the retractable arm, and FIG. 4(b) illustrates the door closed)
Figure 4B:
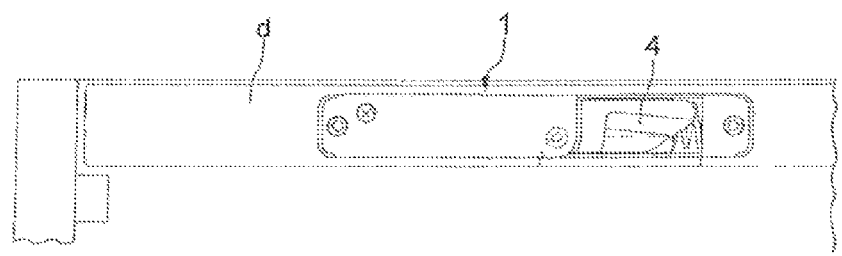

FIG. 3 illustrates a catch 8 that cooperates with the door opening and closing device 1. In FIG. 3, the catch 8 mounted on the upper-side frame f that surrounds the door d is seen from the bottom. The catch 8 has a catch base 11 that is fixed to the lower surface of the frame f by a countersunk screw 10 and a catch shaft 12 that projects from the catch base 11. As illustrated in FIG. 4(a), when the door d gets closed to a certain angle, the retractable arm 4 in the open state catches the catch shaft 12 of the catch 8. While the retractable arm 4 catches the catch shaft 12, the retractable arm 4 tries rotating in the closing direction. Then, as illustrated in FIG. 4(b), the retractable arm 4 makes the door d completely closed.

When a person goes out of a room and closes the door d lightly, sometimes the door d is not closed completely. Even when the door d is closed lightly, the door d can be closed completely by making the retractable arm 4 of the door opening and closing device 1 catch the catch shaft 12. And, when the open door d gets closed forcefully by wind or the like, the door opening and closing device 1 attenuates the impact on the door d by the damper provided inside and makes the door d get closed slowly. The door opening and closing device 1 acts to retract the door d and also to slow movement of the door d.

FIGS. 5(a) to 5(d) illustrate the door opening and closing device 1 and the catch 8 mounted on the door d and the frame f. FIG. 5(a) is a side view and FIG. 5(b) is a front view. FIGS. 5(c) and 5(d) are cross sectional views corresponding to FIGS. 5(a) and 5(b). The catch 8 is fixed to the frame f by the countersunk screw 10. The door opening and closing device 1 is fixed to the door d by a retaining screw 13. As illustrated in these figures, when the door d is in the closed state, the retractable arm 4 of the door opening and closing device 1 is also in the closed state. However, strictly speaking, when the door d is in the closed state, the retractable arm 4 of the door opening and closing device 1 is rotated slightly in the opening direction from the closed state. This is for the purpose of preventing rattling of the door d by applying an additional force in the closing direction to the door d in the closed state by the retractable arm 4 of the door opening and closing device 1.

Figure 6:
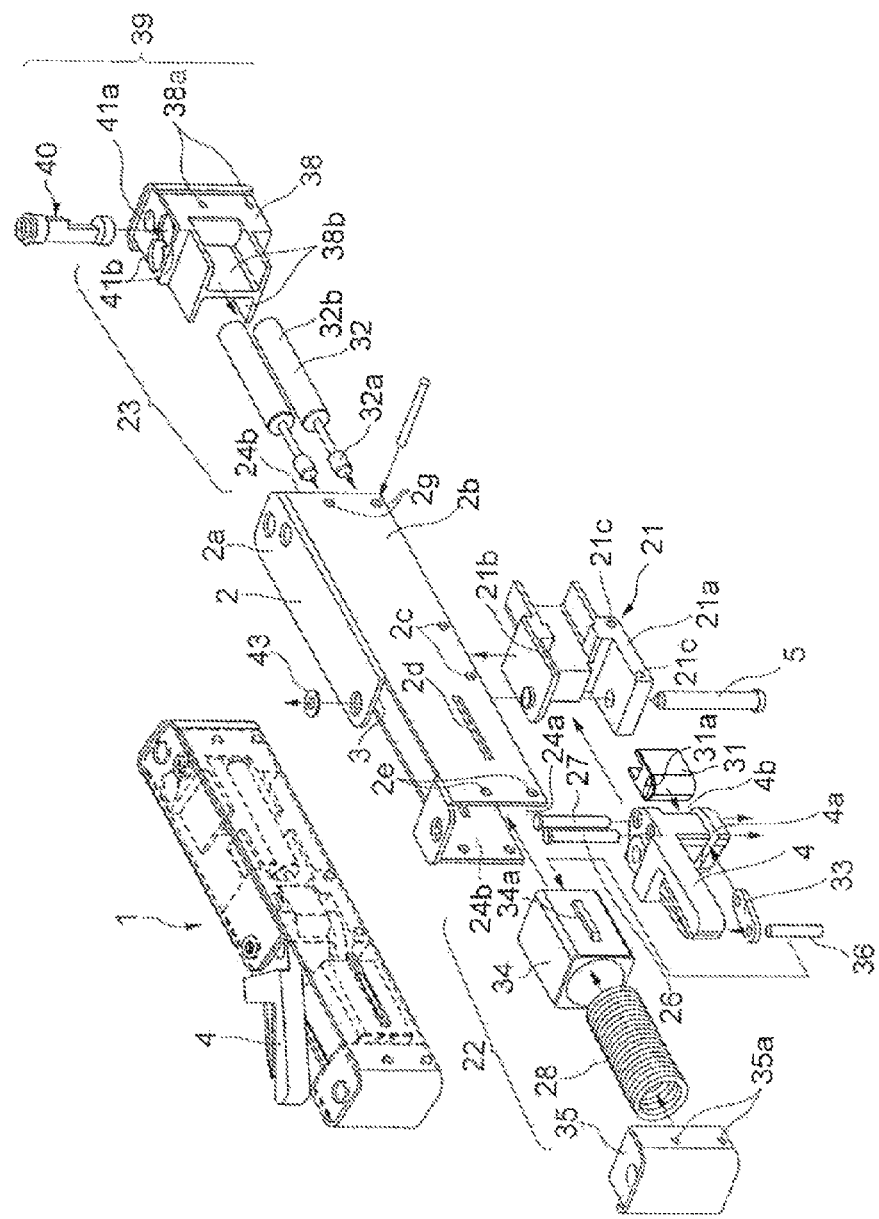
FIG. 6 is an exploded perspective view of the door opening and closing device (including the damper position adjusting device)

FIG. 6 is an exploded perspective view of the door opening and closing device. The door opening and closing device 1 has the body case 2, an arm base 21 which is built in the body case 2, the retractable arm 4 supported rotatable by the arm base 21, a biasing mechanism 22 for giving a torque in the closing or opening direction to the retractable arm 4 and a damper mechanism 23 for attenuating impact when the retractable arm 4 gets closed. The arm base 21 is arranged at the center of the body case 2 in the longitudinal direction. The biasing mechanism 22 is arranged at one side of the body case 2 in the longitudinal direction and the damper mechanism 23 is arranged at the opposite side of the body case 2 to the biasing mechanism 22.

The outline structure of each part is described below. The body case 2 has the ceiling part 2a, and a pair of side wall parts 2b. The cross section of the body case 2 is U shaped. The body case 2 has a lower surface and end surfaces in the longitudinal direction, where openings 24a, 24b are formed for installation of the parts. Besides, in the ceiling part 2a of the body case 2, the notch 3 is formed for exposing the retractable arm 4. This body case 2 is manufactured by sheet metal processing of bending a thin plate.

The arm base 21 is arranged at the center of the body case 2 in the longitudinal direction and is a central part from structural and assembly points of view. The arm base 21 takes an approximately U shape and has first and second wall pars 21a, 21b facing each other. The retractable arm 4 is inserted into between the first and second wall parts 21a, 21b and the retractable arm axis 5 is made to pass through the arm base 21 and the retractable arm 4 from below, thereby connecting the retractable arm 4 to the arm base 21 rotatably. After the retractable arm 4 is connected to the arm base 21, the arm base 21 is inserted into and connected to the body case 2. Connection of the arm base 21 and body case 2 is made with use of a rivet, screw or the like. In the arm base 21 and the body case 2, mounting holes 21c and 2c are formed for connecting the arm base 21 to the body case 2.

Figure 7:
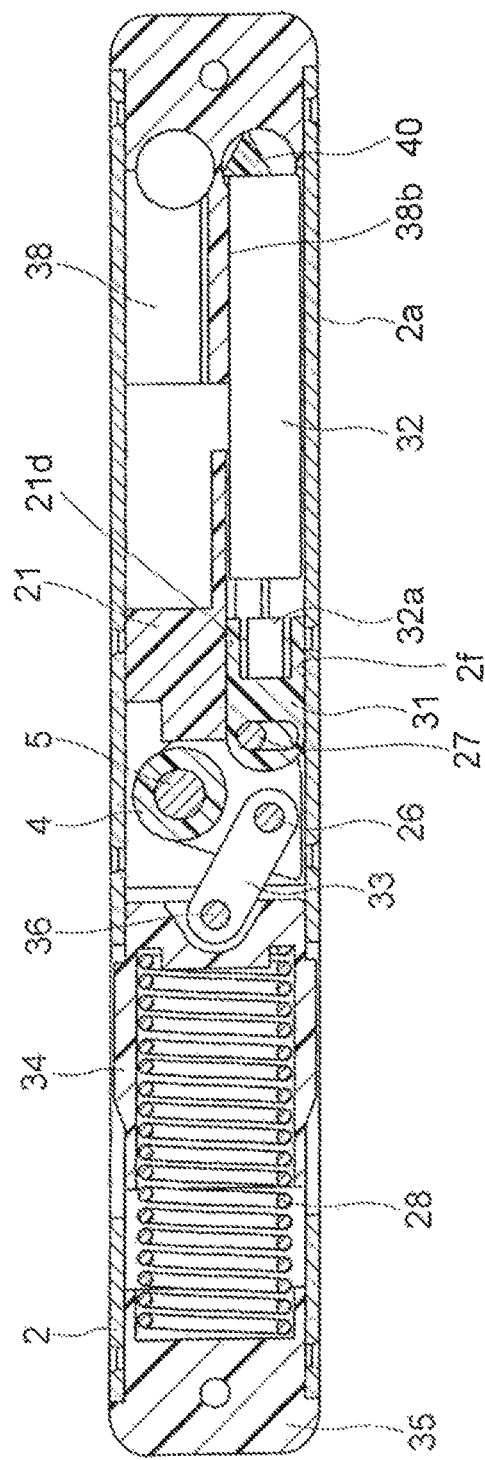
FIG. 7 is a cross sectional view of the door opening and closing device.

The retractable arm 4 rotates around the retractable arm axis 5. The first and second link shafts 26, 27 are inserted into the retractable arm 4 at off-center positions from the retractable arm axis 5. As illustrated in FIG. 7, the first link shaft 26 is always given a force of a coil spring 28 of the biasing mechanism 22. With this spring force of the coil spring 28, a force to retract the door d acts on the retractable arm 4. A slide block 31 of the damper mechanism 23 is connected to the second link shaft 27. When the retractable arm 4 rotates in the closing direction, the slide block 31 pushes the heads of the rods 32a of the dampers 32. Therefore, if the retractable arm 4 tries to rotate in the closing direction quickly, the dampers 32 make the retractable arm 4 rotate slowly.

As illustrated in FIG. 6, the biasing mechanism 22 has the above-mentioned first link shaft 26, a link plate 33, a slide spring case 34, the coil spring 28 and a spring base 35.

In the retractable arm 4, a slit 4a is formed. While the link plate 33 is fit in the slit 4a in such a way as to sandwich the link plate 33, the first link shaft 26 is made to pass through the retractable arm 4 and the link plate 33 from above thereby to connect the link plate 33 to the retractable arm 4. At the other end of the link plate 33, a spring linking shaft 36 is fit therein. This spring linking shaft 36 is used to connect the slide spring case 34 to the link plate 33.

The slide spring case 34 is mounted in the body case 2 to be linearly movable. In a side surface of the slide spring case 34, a protrusion 34a is formed elongated linearly. In the body case 2, a slit 2d is formed for fitting the protrusion 34a therein. Linear movement of the slide spring case 34 relative to the body case 2 is guided by the slit 2d of the body case 2.

In the slide spring case 34, a hole is formed of which the diameter is slightly larger than the diameter of the coil spring 28. The coil spring 28 is inserted in this hole. At the opposite side of the coil spring 28 to the slide spring case 34, the spring base 35 is arranged. The spring base 35 has a hole of which diameter is slightly larger than the diameter of the coil spring 28. The coil spring 28 is compressed between the slide spring case 34 and the spring base 35. The spring base 35 is fixed to the end of the body case 2 by a rivet, screw or the like. In the spring base 35 and the body case 2, mounting holes 35a, 2e are formed for connecting the spring base 35 to the body case 2.

The damper mechanism 23 has the second link shaft 27, the slide block 31, dampers 23, and a damper position adjusting device 39 for adjusting the positions of the dampers in the stroke direction. The damper position adjusting device 39 has a damper base 38 and a damper adjusting shaft 40 mounted rotatable in the damper base 38.

In the retractable arm 4, a notch 4b is formed for insertion of the slide block 31. The slide block 31 is inserted into the notch 4b of the retractable arm 4 and the second link shaft 27 is made to pass through the retractable arm 4 and the slide block 31 from above, thereby connecting the slide block 31 to the retractable arm 4. In the slide block 31, a long hole 31a is formed in which the second link shaft 27 passes through. This is for the purpose of moving the slide block 31 linearly when the retractable arm 4 is rotated. As illustrated in FIG. 7, the head of the rod 32a of the damper 32 is inserted into the slide block 31. Linear movement of the slide block 31 is guided by the inner wall surface 2f of the body case 2 and the wall surface 21d of the arm base 21.

As illustrated in FIG. 6, the damper 32 used here is an extendable damper 32 having the rod 32a as a movable part that moves relative to a cylinder 32b as a damper main body. In the rod 32a, a piston is provided integral therewith and inserted in the cylinder 32b. In the cylinder 32b, viscous fluid is filled such as coil or grease. When the piston of the rod 32a moves relative to the cylinder 32b, the viscous fluid resists movement of the piston generates a damping force. Besides, in the cylinder 32b, a coil spring is provided for returning the compressed rod 32a to its original position. In this example, two, upper and lower, dampers 32 are arranged in such a way that their axial lines are parallel to each other.

At the end of the body case 2, the damper base 38 is connected thereto by a rivet, screw or the like. The damper base 38 and the body case 2 have mounting holes 38a, 2g for connecting the damper base 38 to the body case 2. The damper base 38 functions as a holding member for the dampers 32. In the damper base 38, the damper adjusting shaft 40 is mounted for adjusting the damping force of the dampers 32. A side wall 44 of the damper adjusting shaft 40 abuts to the back parts of the cylinders 32b of the dampers 32. As the damper adjusting shaft 40 is rotated, the side wall 44 of the damper adjusting shaft 40 pushes the cylinders 32b of the two, upper and lower, dampers 32 in the moving direction of the rods thereby to change the positions of the two dampers 32.

Out of three holes of the damper base 38, one 41a is a hole for mounting the door opening and closing device 1 to the door d. The other two, right and left, holes 41b are provided for insertion of the damper adjusting shaft 40. They are used to support the door d opening to both right and left sides. The direction in which the retractable arm 4 gets out of the body case 2 varies depending on the opening direction of the door d. In order to support both opening directions of the door d with one component only, the two holes 41b are formed. Further, in the damper base 38, damper recesses 38b are formed for storing the upper and lower dampers 32. These damper recesses 38b are provided two, corresponding to the two opening directions of the door d. Here, the position of the notch 3 of the body case 2 needs to change depending on the opening direction of the door d, however, this is satisfied by changing the bending direction of the thin plate and only one die of the thin plate is enough.

According to this embodiment, as the positions of the two dampers 32 arranged in the damper base 38 in parallel to each other are changed, it is possible to broaden the adjustment range of the damping force. Besides, as the positions of the two dampers 32 can be changed simultaneously by the single damper adjusting shaft 40, the adjustment work of the damping force can be facilitated. As described in detail later, the single damper adjusting shaft 40 make the positions of the two dampers 32 in the stroke direction coincide with each other or different from each other. By making the positions of the two dampers 32 in the stroke direction coincide with each other or different from each other, it is possible to adjust the damping force at plural levels.

Figure 8A:
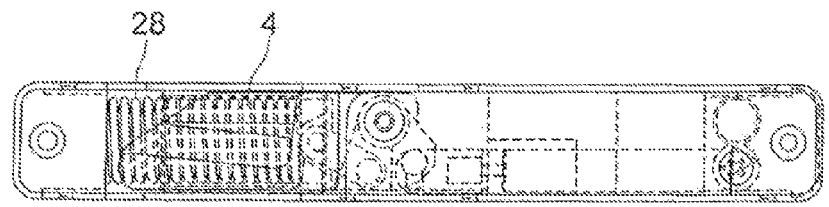
FIGS. 8(a) to 8(c) are operation diagrams of the door opening and closing device (FIG. 8(a) illustrates the retractable arm in the closed state, FIG. 8(b) illustrates the retractable arm in the half-open state and FIG. 8(c) illustrates the retractable arm in the open state)
Figure 8B:
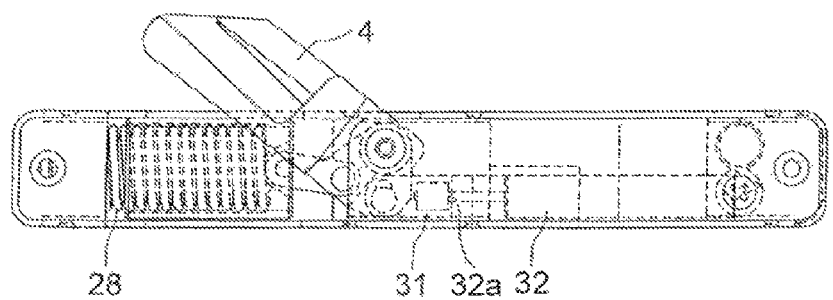
Figure 8C:
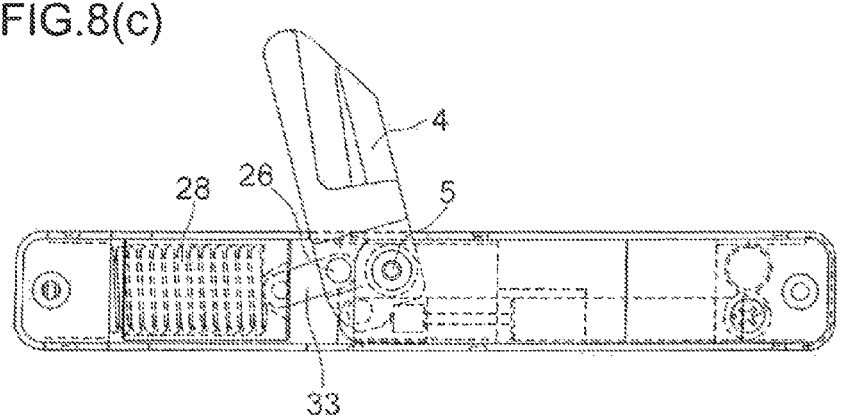
Figure 9A:
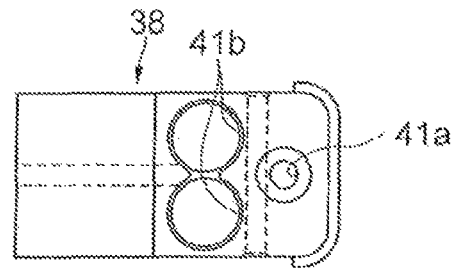
FIGS. 9(a) to 9(d) are detail views of a damper base (FIG. 9(a) is a plan view, FIG. 9(b) is a front view, FIG. 9(c) is a cross sectional view taken along the line A-A and FIG. 9(d) is a left side view)
Figure 9B:
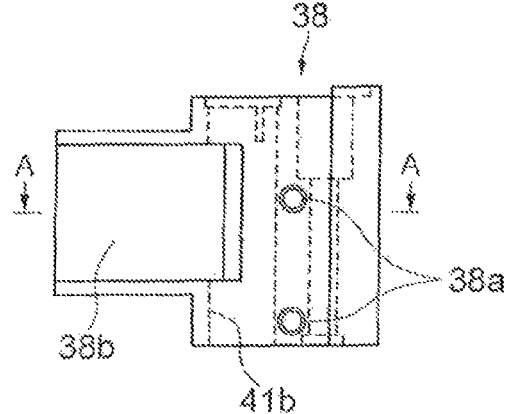
Figure 9C:
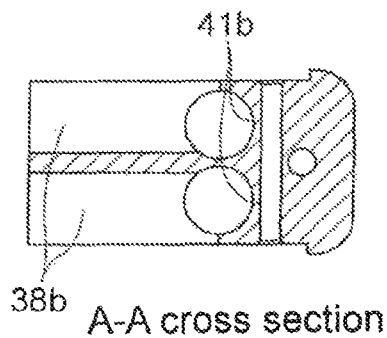
Figure 9D:
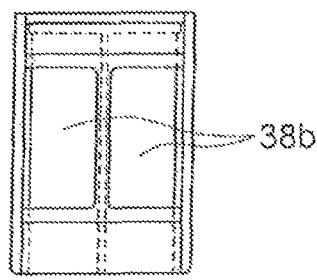

The door opening and closing device 1 operates as follows. The retractable arm 4 is rotated from the closed state as illustrated in FIG. 8(a) to the open state as illustrated in FIG. 8(c). When the retractable arm 4 is in the closed state, the retractable arm 4 is given an additional force to rotate in the closing direction by the spring force of the coil spring 28 of the biasing mechanism 22. When the retractable arm 4 is rotated in the opening direction against the spring force of the coil spring 28, it reaches the change point of the biasing mechanism 22. Then, the retractable arm 4 is further rotated in the opening direction and passed by the change point of the biasing mechanism 22. As illustrated in FIG. 8(c), a force to rotate the retractable arm 4 in the opening direction is generated by the spring force of the coil spring 28. Here, at the change point, the line connecting the retractable arm axis 5 to the first link shaft 26 coincides with the direction where the link plate 33 extends, and no force to rotate the retractable arm 4 is generated.

When the door d in the open state as illustrated in FIG. 8(c) is to be closed, the retractable arm is rotated in the counter-clockwise direction. As illustrated in FIG. 8(b), when passing the change point of the biasing mechanism 22, the retractable arm 4 is given a force to rotate in the closing direction by the spring force of the coil spring 28. Accordingly, it becomes possible to close the door d automatically. Besides, as the retractable arm 4 rotates in the closing direction, the slide block 31 pushes the heads of the rods 32a of the dampers 32. Therefore, rotation of the retractable arm 4 can be made slow.

When the retractable arm 4 is rotated in the closing direction, the slide block 31 is made to abut to the heads of the rods 32a of the dampers 32 so that the dampers 32 can resist linear movement of the slide block 31. Meanwhile, when the retractable arm 4 is rotated in the opening direction, the slide block 31 goes away from the heads of the rods 32a of the dampers 32 so as to prevent the dampers 32 from resisting the linear movement of the slide block 31. This is because no resistance is preferable for opening the door d. As illustrated in FIG. 7, the slide block 31 is not linked to the heads of the rods 32a of the dampers 32. The heads of the rods 32a are merely placed in the slide block 31. The arm base 21 and the body case 2 guide the slide block 31 and the dampers 32 so as to prevent play of the dampers 32 and the slide block 31 when the slide block 31 is away from the dampers 32.

The door opening and closing device 1 is assembled in the following manner. First, as illustrated in FIG. 6, the link plate 33 is inserted into the slit 4a of the retractable arm 4, the first link shaft 26 is inserted into the retractable arm 4 from above and the link plate 33 is linked to the retractable arm 4. Then, the slide block 31 is inserted into the notch 4b of the retractable arm 4, and the second link shaft 27 is inserted into the retractable arm 4 from above so that the slide block 31 is connected to the retractable arm 4. While the link plate 33 and the slide block 31 are connected to the retractable arm 4, the retractable arm 4 is sandwiched between the first and second wall parts 21a, 21b of the arm base 21 facing each other. Then, the arm axis 5 is inserted from below thereby to connect the retractable arm 4 to the arm base 21.

Then, while the retractable arm 4 and the armbase 21 are assembled, the arm base 21 is inserted into the body case 2. The retractable arm axis 5 is inserted into the ceiling part 2a of the body case 2, the end of the retractable arm axis 5 is fixed with a flat washer 43, and rivets are inserted into the mounting holes 2c and 21c of the body case 2 and the arm base 21 to rivet the arm base 21 to the body case 2.

Next, the spring linking shaft 36 is fit in the link plate 33, the slide spring case 34 is fit to the slit 2d of the body case 2 and the slide spring case 34 is connected to the spring linking shaft 36. When the coil spring 28 is inserted in the slide spring case 34, the spring base 35 is inserted via the opening at the end of the body case 2, rivets are inserted into the mounting holes 2e and 35a of the body case 2 and the spring base 35 and the spring base 35 is riveted to the body case 2.

Next, the two dampers 32 are inserted into the arm base 21 via the opening 24c at the opposite end of the body case 2. The damper base 38 is fit into the body case 2, rivets are inserted into mounting holes 2g and 38a of the body case 2 and the damper base 38 and the damper base 38 is riveted to the body case 2.

Through these steps, assembly of all the parts is completed. As the retractable arm 4, the link plate 33 and the slide block 31 are assembled into the arm base 21 in advance and then, the arm base 21 is installed in the body case 2, the assembly work can be facilitated. It is only three parts, that is, the arm base 21, the spring case 35 and the damper base 38, that are connected to the body case 2.

Detail structures of the damper adjusting shaft 40 and the damper base 38 of the damper position adjusting device 39 are as follows. FIGS. 9(a) to 9(d) are detail views of the damper base 38. The damper base 38 has formed therein damper recesses 38b for storing two, upper and lower, dampers 32 and holes 41b for inserting the damper adjusting shaft 40 configured to adjust the strength of the dampers 32. The side wall 44 of the damper adjusting shaft 40 inserted in the hole 41b is exposed in the damper recess 38b. In order to support the door d opening to the left and right, two damper recesses 38b and two holes 41b are provided. The damper recesses 38b of the damper base 38 cooperates with the side wall 2b of the body case 2 to form a frame of the recess where each damper 32 is stored. In the damper base 38, a hole 41a is also formed for mounting the door opening and closing device 1 on the door upper surface.

Figure 10A:
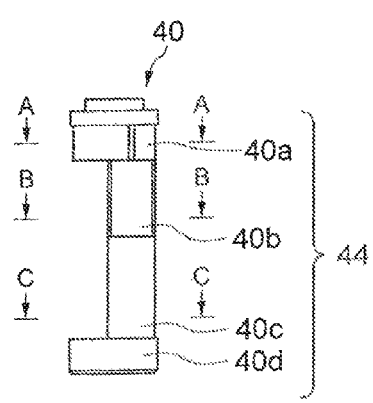
FIGS. 10(a) to 10(e) are detail views of a damper adjusting shaft (FIG. 10(a) is a front view, FIG. 10(b) is a plan view, FIG. 10(c) is a cross sectional view taken along the line A-A, FIG. 10(d) is a cross sectional view taken along the line B-B and FIG. 10(e) is a cross sectional view taken along the line C-C)

FIGS. 10(a) to 10(e) illustrate the damper adjusting shaft 40 which is inserted into a hole 41b of the damper base 38. The cross sectional shape of the side wall 44 of the damper adjusting shaft 40 varies between the upper step 40a, middle step 40, lower step 40c and bottom step 40d. As illustrated in FIG. 10(a), the cross sectional shape of the upper step 40a of the damper adjusting shaft 40 is round, and on its outer peripheral surface, three protrusions 51 are formed 120-degree separated from each other. In the inner peripheral surface of the hole 41b of the damper base 38, three recesses are formed 120-degree separated from each other, and the protrusions 51 are fit in these recesses. In the upper surface of the damper adjusting shaft 40, a cross-shaped groove part 63 is formed. The damper adjusting shaft 40 can be rotated by placing a driver on the cross-shaped groove part 63 of the damper adjusting shaft 40 and rotating the driver. With engagement between the protrusions 51 and the recesses, the damper adjusting shaft 40 is positioned by each 120-degree rotation. The cross section of the bottom step 40d of the damper adjusting shaft 40 is round like the upper-step round part 40a. The bottom step 40d of the damper adjusting shaft 40 is fit in the lower part of the hole 41b of the damper base 38 (see FIG. 9(b)).

Figure 10D:
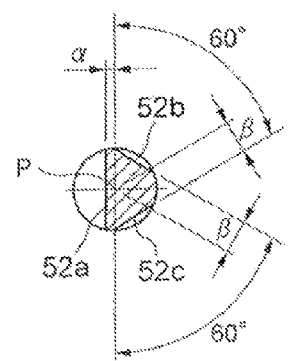
Figure 10B:
Figure 10E:
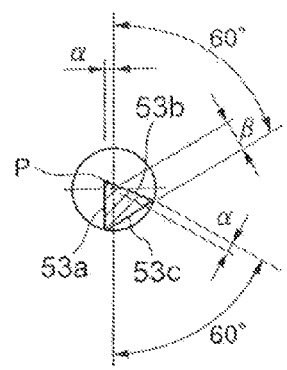
Figure 10C:
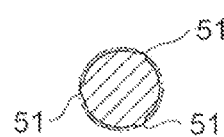
Figure 11A:
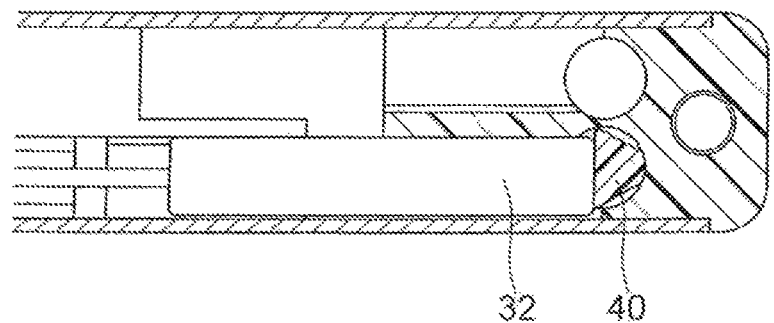
FIGS. 11(a) and 11(b) are views illustrating a damper position-adjusted by the damper adjusting shaft (FIG. 11(a) illustrates the damper moved backward, and FIG. 11(b) illustrates the damper pushed forward)
Figure 11B:
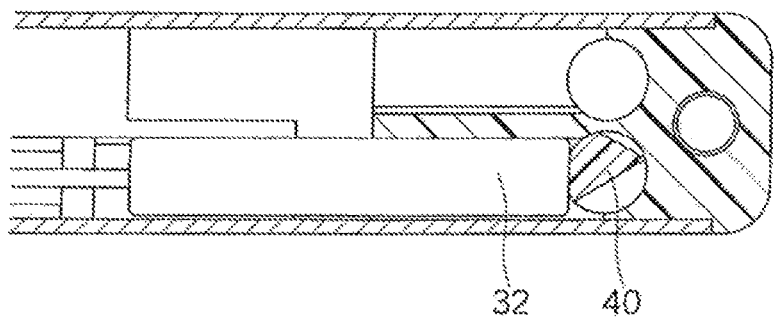

As illustrated in FIG. 10(d), the cross sectional shape of the middle step 40b of the side wall 44 of the damper adjusting shaft 40 is a triangle. On side 52a of the middle-step triangle is near the rotational center and its distance is α. The other two sides 52b, 52c are away from the rotational center and their distance is β. The height of the middle step of the damper adjusting shaft 40 is equal to the height of the upper damper 32 out of the two dampers 32, and one side of 52a to 52c of the triangle of the middle step 40b of the damper adjusting shaft 40 is in contact with the cylinder of the upper damper 32. The one side that is in contact with the cylinder of the damper 32 switches between 52a to 52c by rotating the damper adjusting shaft 40. When the side 52a is in contact with the damper 32, the damper 32 can be moved backward, while, when the side 52b or 52c is in contact with the damper 32, the damper can be pushed forward. FIG. 11(a) illustrates the damper 32 moved backward by the damper adjusting shaft 40 and FIG. 11(*b*) illustrates the damper 32 pushed forward by the damper adjusting shaft 40.

As illustrated in FIG. 10(*e*), the cross sectional shape of the lower step 40*c* of the side wall 44 of the damper adjusting shaft 40 is also a triangle, which is different from the cross sectional shape of the middle step 40*b* of the side wall. This enables to make the positions of the two dampers in the stroke direction coincide with each other or different from each other. As illustrated in FIG. 10(*e*), two sides 53*a* and 53*b* of the lower-step triangle are near the rotational center and their distance is α. The other side 53*c* is away from the rotational center and its distance is β. The height of the lower step 40*c* of the damper adjusting shaft 40 is equal to the height of the lower damper 32 out of the two dampers 32. One side of the triangle of the lower step 40*c* of the damper adjusting shaft 40 is in contact with the cylinder of the lower damper 32. By rotating the damper adjusting shaft 40, the sides in contact with the cylinder of the damper 32 can vary. When the sides 53*a* and 53*b* are in contact with the damper 32, the damper 32 can be moved backward, while when the side 53*c* is in contact with the damper 32, the damper 32 can be pushed forward.

With use of this damper adjusting shaft 40, it is possible to adjust the positions of the two dampers 32 at three levels by rotating the damper adjusting shaft 40 by 120 degrees. That is, it is possible to switch between the state where two dampers 32 are pushed forward as illustrated in FIG. 12(*a*), the state where the upper damper 32 is pushed forward and the lower damper 32 is not pushed as illustrated in FIG. 12(*b*) and the state where the two dampers 32 are not pushed as illustrated in FIG. 12(*c*), sequentially. The damping force is also switched between three levels of large, middle and small. In this embodiment, the damper 32 used here is a damper that exerts a large damping force at a final stroke of 5 mm, for example. Therefore, the damping force for the stroke of the slide block 31 is as illustrated in the graph in the right side of FIG. 12.

As illustrated in FIG. 12(*a*), when the two dampers 32 are pushed forward by the damper adjusting shaft 40, it is possible to generate a large damping force from the beginning when the door d gets closed. And, when the stroke of the rod 32*a* of the damper 32 is equal to or greater than a predetermined distance, the largest damping force can be generated. This allows support for a heavy door.

As illustrated in FIG. 12(*b*), while the damper adjusting shaft 40 pushes the upper damper 32 and does not push the lower damper 32, the damping force is increased in stages in accordance with the stroke of the rod 32*a*. At the beginning when the door d gets closed, the damping force is generated only from the upper damper 32. After that, the damping force is generated from the two, upper and lower, dampers 32 and then, the damping force generated from the upper damper 32 becomes more increased. In the state illustrated in FIG. 12(*b*), the damping force is a middle level and allows supports for a middle-weight door.

As illustrated in FIG. 12(*c*), while the damper adjusting shaft does not push the two dampers 32, there is a gap created between the dampers 32 and the side of the damper adjusting shaft 40. At the beginning when the door d gets closed, no damping force is generated. When the door d is closed by a predetermined stroke, a damping force is generated which is a sum of damping forces from the two dampers 32. When the door d is closed completely, the rods 32*a* is not moved long, the damping force is not as large as those illustrated in FIGS. 12(*a*) and 12(*b*). In the state illustrated in FIG. 12(*c*), the damping force is small and allows support for a light-weight door.

Here, as to the phrase "the dampers 32 are pushed", it includes the state where the side wall 44 of damper adjusting shaft 40 in contact with the damper 32 pushes the dampers 32, as described above, and the state where the position of the side wall 44 of the damper adjusting shaft 40 out of contact with the dampers 32 is changed and the positions of the dampers 32 are not changed. For example, it includes the state where the side wall 44 of the damper adjusting shaft 40 is moved from the state illustrated in FIG. 12(*c*) toward the slide block 31 before abutting to the dampers 32.

Figure 13A:
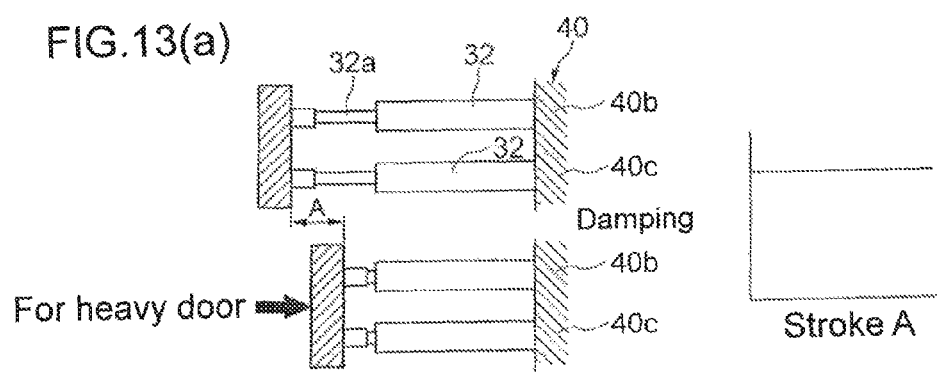
FIGS. 13(a) to 13(c) are schematic diagrams illustrating the relationship between positions of the damper and damping forces (FIG. 13(a) illustrates the case of a heavy door, FIG. 13(b) illustrates the case of a middle-weight door, and FIG. 13(c) illustrates the case of a light-weight door)
Figure 13B:
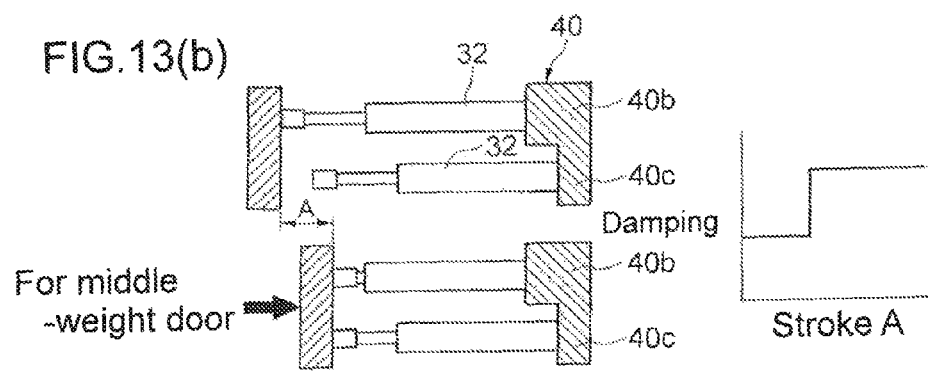
Figure 13C:
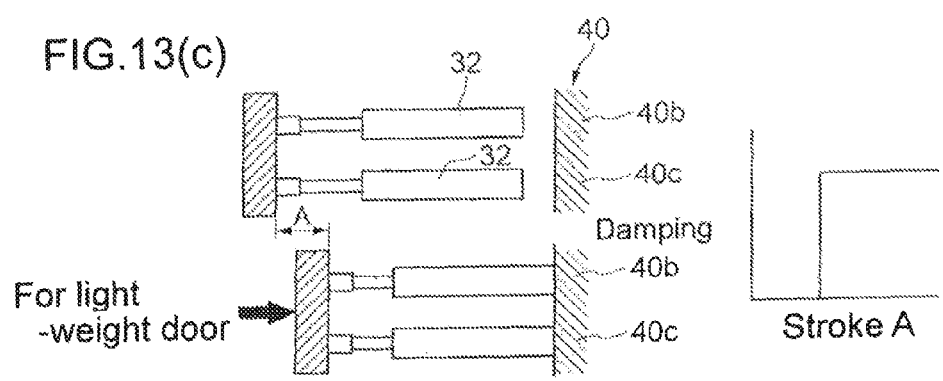

Irrespective of the stroke of the rod, the damper 32 may be a damper with a fixed damping force. FIGS. 13(*a*) to 13(*c*) illustrate states where the two dampers 32 with fixed damping forces are used and the positions of the dampers 32 in the stroke direction are changed by the damper adjusting shaft 40 (left side view) and damping forces generated in these states (right side view). In this example, the positions of the two dampers 32 in the stroke direction are also changed in three stages. That is, it is possible to switch between the state where the damper adjusting shaft 40 pushes the two dampers 32 forward as illustrated in FIG. 13(*a*), the state where the damper adjusting shaft 40 pushes the upper damper 32 forward and does not push the lower damper 32 as illustrated in FIG. 13(*b*) and the state where the damper adjusting shaft 40 does not push the two dampers 32 as illustrated in FIG. 13(*c*), sequentially. The damping force is also switched between three levels of large, middle and small, as illustrated in the graph in the right side of FIGS. 13(*a*) to 13(*c*).

Figure 14:
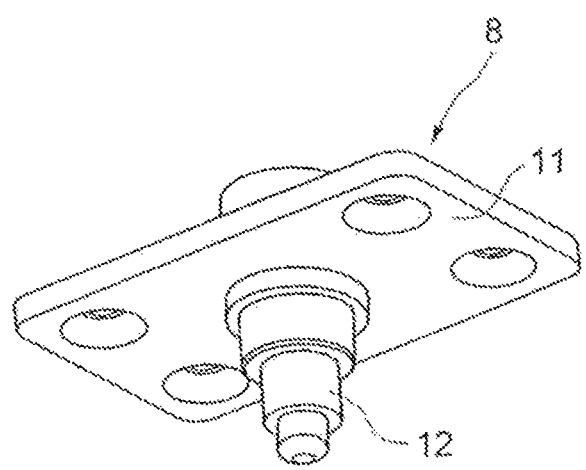
FIG. 14 is a perspective view of the catch.
Figure 15:
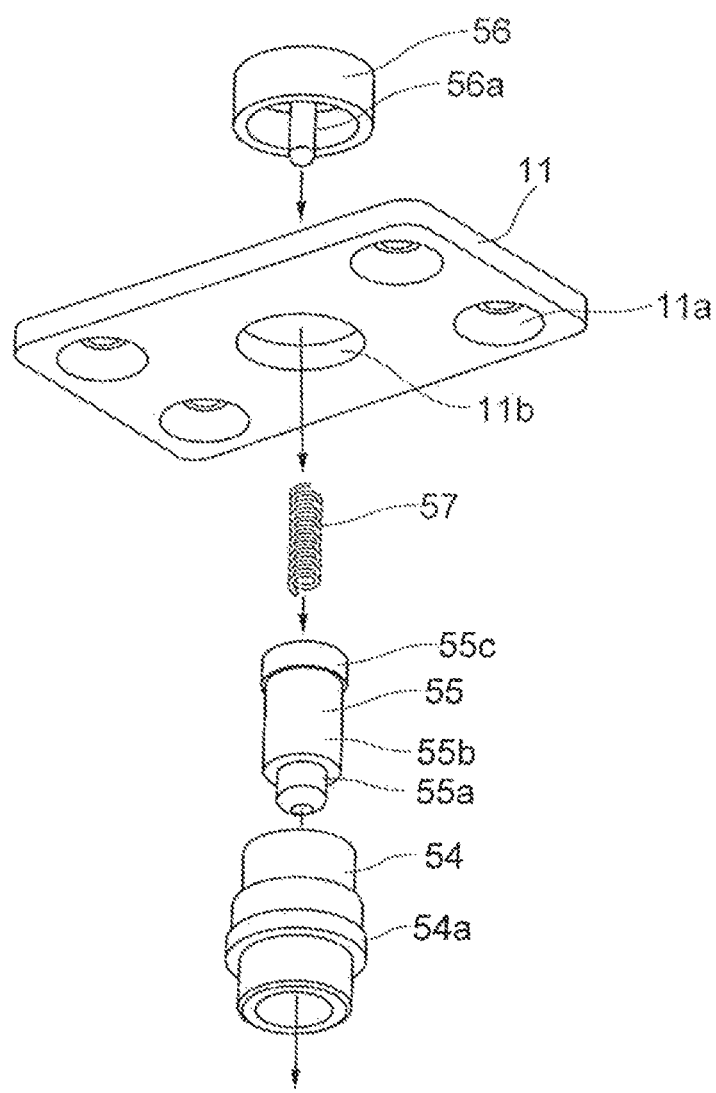
FIG. 15 is an exploded perspective view of the catch.

FIGS. 14 and 15 are detail views of the catch 8. FIG. 14 is a perspective view of the catch 8 and FIG. 15 is an exploded perspective view of the catch 8. As illustrated in FIG. 14, the catch 8 has the catch base 11 mounted on the frame f and the catch shaft 12 projecting from the catch base 11. The retractable arm 4 of the door opening and closing device 1 catches the catch shaft 12 of the catch 8 to open and close the door d.

As illustrated in FIG. 15, the catch base 11 is formed into a rectangle. At four corners of the catch base 11, four countersunk screw-mounting holes 11*a* are formed. At a center hole 11*b* of the catch base 11, the catch shaft 12 is fit therein.

The catch shaft 12 has a hollow-cylindrical catch outer shaft 54, a cylindrical catch inner shaft 55 enclosed at one end, and a back cover 56. On the outer peripheral surface of the catch outer shaft 54, a flange 54*a* is formed, and the catch outer shaft 54 is pushed into the hole 11*b* of the catch base 11 until the flange 54*a* abuts to the catch base 11. The back cover 56 is connected to the catch outer shaft 54 from the back surface side of the catch base 11. In the back cover 56, a support bar 56*a* is formed, which is fit in the center of a catch spring 57 to support the catch spring 57.

In the catch outer shaft 54, the catch inner shaft 55 is fit. The catch inner shaft 55 is of an approximately cylindrical shape and is enclosed at a tip end. At the tip end of the catch inner shaft 55, a cylindrical small-diameter part is formed. That is, in the catch inner shaft 55, the small-diameter part 55*a* and a large-diameter part 55*b* which is concentric with the small-diameter part are formed. With these small-diameter part 55*a* and large-diameter part 55*b*, step difference is provided at the tip end of the catch inner shaft 55. The catch spring 57 is inserted into the large-diameter part 55*b* of the catch inner shaft 55. The catch spring 57 is placed between the catch inner shaft 55 and the back cover 56 to make the catch inner shaft 55 jut from the catch outer shaft 54. The catch inner shaft 55 is made to jut from the catch outer shaft 54 until the flange 55*c* of the catch inner shaft 55 abuts to the step difference in the inner peripheral surface of the catch outer shaft 54. Needless to say, the catch inner shaft 55 may be pushed into the catch outer shaft 54 against the spring force of the catch spring 57.

Figure 16A:
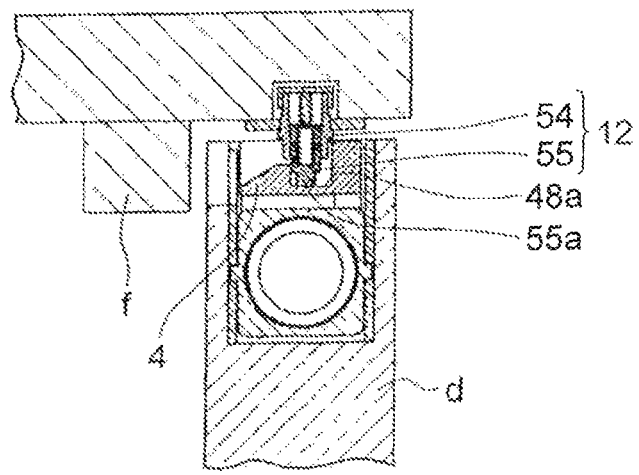
FIGS. 16(a) and 16(b) are views illustrating the relationship between the catch and the retractable arm (FIG. 16(a) illustrates the catch shaft fit in the groove part of the retractable arm and FIG. 16(b) illustrates a small-diameter part of the catch shaft fit in the groove part of the retractable arm).

As illustrated in FIG. 16(a), when the door d is closed, in order to prevent rattling of the door d, the retractable arm 4 of the door opening and closing device 1 catches the catch shaft 12 to give an additional force in the closing direction, even if the door d comes into contact with the frame f. That is, when the door d is closed, the retractable arm 4, itself, is not rotated to the completely closed state and the rotation angle of the retractable arm 4 is just before the closed-state rotation angle. There still remains room for the retractable arm 4 to rotate in the closing direction.

Figure 16B:
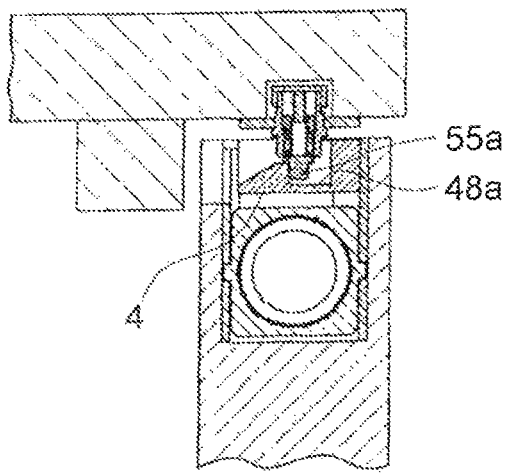

If the retractable arm 4 in the open state is brought into the closed state as a result of incorrect usage, such as a prank, the retractable arm 4 is rotated to the closed state. In this case, if the door d is tried to be closed into the return state where the catch shaft 12 is fit in the groove part 48a of the retractable arm 4, the catch shaft 12 cannot be fit in the groove part 48a of the retractable arm 4. As illustrated in FIG. 16(b), as the small-diameter part 55a is formed at the tip end of the catch shaft 12, if the retractable arm 4 is rotated to the closed state, the small-diameter part 55a can be caught in the groove part 48a of the retractable arm 4 by a difference of diameter between the large-diameter part 55b and the small-diameter part 55a. When the small-diameter part 55a of the catch shaft 12 can be caught in the groove part 48a of the retractable arm 4, the retractable arm 4 can be rotated to the open state, and in next use, the catch shaft 12 will be able to be caught in the groove part 48a of the retractable arm 4 so that the door opening and closing device 1 can be used in a normal way.

Here, the present invention is not limited to the above-described embodiments and may be embodied in various forms without departing from the scope of the present invention.

The damper base may be mounted on a frame or door directly without the body case provided therebetween and plural dampers may abut directly to the door. In this case, in the damper recess of the damper base, a frame-shaped wall is formed surrounding the damper so as to prevent the damper from falling down.

The damper position adjusting device of the present invention is applicable to dampers of not only a construction door, but also a construction sliding door, a furniture door, a drawer and the like.

The present specification is based on Japanese Patent Applications No. 2009-191868 filed on Aug. 21, 2009, the entire contents of which are expressly incorporated by reference herein.

REFERENCE NUMERALS

32 . . . damper
32a . . . movable part (rod)
32b . . . cylinder (damper main body)
38 . . . damper base
38b . . . damper recess
40 . . . damper adjusting shaft
44 . . . side wall of damper adjusting shaft
41b . . . hole of damper base
40a . . . round part of damper adjusting shaft
40b . . . middle step of damper adjusting shaft (part in contact with one of plural dampers)
40c . . . bottom step of damper adjusting shaft (part in contact with another of plural dampers)
51 . . . positioning protrusion
52a, 53a . . . one side of triangle (at least one side)
52b, 52c, 53a, 53b . . . other two sides of triangle (at least one of the other sides)

The invention claimed is:

1. A damper position adjusting device comprising:
a damper base for storing a plurality of dampers, each of the dampers having a movable part that moves relative to a damper main body, the plurality of dampers being stored parallel to each other in a first direction parallel to a moving direction of the movable part; and
a damper adjusting shaft which is mounted rotatable in the damper base and has a side wall in direct contact with ends of the dampers in a moving direction, the damper adjusting shaft having an axis transverse to the first direction,
wherein when the damper adjusting shaft rotates around the axis thereof, the side wall of the damper adjusting shaft pushes at least one of the dampers in the moving direction of the movable part to change a position of the at least one of the dampers relative to the damper base.

2. The damper position adjusting device of claim 1, wherein the damper adjusting shaft is rotated around the axis thereby to make positions of the dampers in the moving direction coincide with each other or different from each other.

3. The damper position adjusting device of claim 2, wherein
the side wall of the damper adjusting shaft has a cross sectional shape of polygon, of which a side is in contact with the damper,
at least one side of the polygon is different in a distance from a rotational center of the damper adjusting shaft from at least one of the remaining sides, and
in the side wall of the damper adjusting shaft, a polygonal cross sectional shape of a part in contact with one of the dampers is different from a polygonal cross sectional shape of a part in contact with another of the dampers.

4. The damper position adjusting device of claim 2, wherein
the damper adjusting shaft has a round part with a plurality of positioning protrusions or positioning recesses formed on an outer peripheral surface thereof separated from each other by a predetermined distance,
the damper base has a hole in which the round part of the damper adjusting shaft is fit,
the hole has an inner peripheral surface on which a plurality of positioning recesses or positioning protrusions are formed separated from each other by the predetermined distance to fit to the positioning protrusions or positioning recesses of the damper adjusting shaft, and
every time the damper adjusting shaft rotates by a predetermined angle in the hole of the damper base, the positioning recesses and the positioning protrusions are fit to each other thereby to be able to position the damper adjusting shaft.

5. The damper position adjusting device of claim 3, wherein
the damper adjusting shaft has a round part with a plurality of positioning protrusions or positioning recesses formed on an outer peripheral surface thereof separated from each other by a predetermined distance,
the damper base has a hole in which the round part of the damper adjusting shaft is fit,
the hole has an inner peripheral surface on which a plurality of positioning recesses or positioning protrusions are formed separated from each other by the predetermined distance to fit to the positioning protrusions or positioning recesses of the damper adjusting shaft, and
every time the damper adjusting shaft rotates by a predetermined angle in the hole of the damper base, the positioning recesses and the positioning protrusions are fit to each other thereby to be able to position the damper adjusting shaft.

6. A damper position adjusting device comprising:
a damper base for storing a plurality of dampers in parallel to each other, each of the dampers having a movable part that moves relative to a damper main body; and
a damper adjusting shaft which is mounted rotatable in the damper base and has a side wall in contact with ends of the dampers in a moving direction,
wherein when the damper adjusting shaft rotates around an axis thereof, the side wall of the damper adjusting shaft pushes at least one of the dampers out in the moving direction of the movable part to change a position of the at least one damper relative to the damper base, and to switch among a state where the dampers are not pushed, a state where at least one of the dampers is pushed and at least one of the remaining dampers is not pushed, and a state where the dampers are pushed.

7. The damper position adjusting device of claim 6, wherein
the side wall of the damper adjusting shaft has a cross sectional shape of polygon, of which a side is in contact with the damper,
at least one side of the polygon is different in a distance from a rotational center of the damper adjusting shaft from at least one of the remaining sides, and
in the side wall of the damper adjusting shaft, a polygonal cross sectional shape of a part in contact with one of the dampers is different from a polygonal cross sectional shape of a part in contact with another of the dampers.

8. The damper position adjusting device of claim 6, wherein
the damper adjusting shaft has a round part with a plurality of positioning protrusions or positioning recesses formed on an outer peripheral surface thereof separated from each other by a predetermined distance,
the damper base has a hole in which the round part of the damper adjusting shaft is fit,
the hole has an inner peripheral surface on which a plurality of positioning recesses or positioning protrusions are formed separated from each other by the predetermined distance to fit to the positioning protrusions or positioning recesses of the damper adjusting shaft, and
every time the damper adjusting shaft rotates by a predetermined angle in the hole of the damper base, the positioning recesses and the positioning protrusions are fit to each other thereby to be able to position the damper adjusting shaft.

9. The damper position adjusting device of claim 7, wherein
the damper adjusting shaft has a round part with a plurality of positioning protrusions or positioning recesses formed on an outer peripheral surface thereof separated from each other by a predetermined distance,
the damper base has a hole in which the round part of the damper adjusting shaft is fit,
the hole has an inner peripheral surface on which a plurality of positioning recesses or positioning protrusions are formed separated from each other by the predetermined distance to fit to the positioning protrusions or positioning recesses of the damper adjusting shaft, and
every time the damper adjusting shaft rotates by a predetermined angle in the hole of the damper base, the positioning recesses and the positioning protrusions are fit to each other thereby to be able to position the damper adjusting shaft.

10. A damper position adjusting device comprising:
a damper base for storing a plurality of dampers in parallel to each other, each of the dampers having a movable part that moves relative to a damper main body; and
a damper adjusting shaft which is mounted rotatable in the damper base and has a side wall in contact with ends of the dampers in a moving direction,
wherein
when the damper adjusting shaft rotates around an axis thereof, the side wall of the damper adjusting shaft pushes at least one of the dampers out in the moving direction of the movable part to change a position of the at least one damper relative to the damper base,
the side wall of the damper adjusting shaft has a cross sectional shape of polygon, of which a side is in contact with the damper,
at least one side of the polygon is different in a distance from a rotational center of the damper adjusting shaft from at least one of the remaining sides, and
in the side wall of the damper adjusting shaft, a polygonal cross sectional shape of a part in contact with one of the dampers is different from a polygonal cross sectional shape of a part in contact with another of the dampers.

11. The damper position adjusting device of claim 10, wherein
the damper adjusting shaft has a round part with a plurality of positioning protrusions or positioning recesses formed on an outer peripheral surface thereof separated from each other by a predetermined distance,
the damper base has a hole in which the round part of the damper adjusting shaft is fit,
the hole has an inner peripheral surface on which a plurality of positioning recesses or positioning protrusions are formed separated from each other by the predetermined distance to fit to the positioning protrusions or positioning recesses of the damper adjusting shaft, and
every time the damper adjusting shaft rotates by a predetermined angle in the hole of the damper base, the positioning recesses and the positioning protrusions are fit to each other thereby to be able to position the damper adjusting shaft.

12. A damper position adjusting device comprising:
a damper base for storing a plurality of dampers in parallel to each other, each of the dampers having a movable part that moves relative to a damper main body; and
a damper adjusting shaft which is mounted rotatable in the damper base and has a side wall in contact with ends of the dampers in a moving direction,
wherein
when the damper adjusting shaft rotates around an axis thereof, the side wall of the damper adjusting shaft pushes at least one of the dampers out in the moving direction of the movable part to change a position of the at least one damper relative to the damper base,
the damper adjusting shaft has a round part with a plurality of positioning protrusions or positioning recesses formed on an outer peripheral surface thereof separated from each other by a predetermined distance,
the damper base has a hole in which the round part of the damper adjusting shaft is fit,
the hole has an inner peripheral surface on which a plurality of positioning recesses or positioning protrusions are formed separated from each other by the predetermined distance to fit to the positioning protrusions or positioning recesses of the damper adjusting shaft, and
every time the damper adjusting shaft rotates by a predetermined angle in the hole of the damper base, the positioning recesses and the positioning protrusions are fit to each other thereby to be able to position the damper adjusting shaft.

13. A damper position adjusting device comprising:

a damper base for storing a plurality of dampers, each of the dampers having a movable part that moves relative to a damper main body, the plurality of dampers being stored parallel to each other in a first direction parallel to a moving direction of the movable part; and a damper adjusting shaft which is mounted rotatable in the damper base and has a side wall in direct contact with ends of the dampers in a moving direction, the damper adjusting shaft having an axis transverse to the first direction, wherein a cross sectional shape of the side wall of the damper adjusting shaft has a plurality of sides in direct contact with the dampers, and at least one of the sides is different in a distance from a rotational center of the damper adjusting shaft from at least one of the remaining sides.

* * * * *